US010171802B2

(12) United States Patent
Tanaka et al.

(10) Patent No.: US 10,171,802 B2
(45) Date of Patent: Jan. 1, 2019

(54) CALIBRATION METHOD AND CALIBRATION DEVICE

(71) Applicant: DENSO CORPORATION, Kariya, Aichi-pref. (JP)

(72) Inventors: Hitoshi Tanaka, Chiryu (JP); Masayuki Imanishi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 753 days.

(21) Appl. No.: 14/431,456

(22) PCT Filed: Sep. 5, 2013

(86) PCT No.: PCT/JP2013/005276
§ 371 (c)(1),
(2) Date: Mar. 26, 2015

(87) PCT Pub. No.: WO2014/054223
PCT Pub. Date: Apr. 10, 2014

(65) Prior Publication Data
US 2015/0254853 A1 Sep. 10, 2015

(30) Foreign Application Priority Data

Oct. 2, 2012 (JP) .................................. 2012-220622

(51) Int. Cl.
G06T 7/73 (2017.01)
H04N 17/00 (2006.01)
(Continued)

(52) U.S. Cl.
CPC ............. H04N 17/002 (2013.01); B60R 1/00 (2013.01); G06T 7/73 (2017.01); G06T 7/80 (2017.01);
(Continued)

(58) Field of Classification Search
CPC ........................................................ G06T 7/80
(Continued)

(56) References Cited

U.S. PATENT DOCUMENTS 6,561,202 B1 * 5/2003 Amadio .................... B60S 3/04
134/123
2001/0012985 A1 8/2001 Okamoto et al.
(Continued)

FOREIGN PATENT DOCUMENTS

JP 2004280728 A * 10/2004
JP 2008-209354 A 9/2008
(Continued)

OTHER PUBLICATIONS

International Search Report of the International Searching Authority dated Oct. 22, 2013 in the corresponding International application No. PCT/JP2013/005276 (and English translation).
(Continued)

Primary Examiner — Jeremiah C Hallenbeck-Huber
Assistant Examiner — Amir Shahnami
(74) Attorney, Agent, or Firm — Posz Law Group, PLC

(57) ABSTRACT

A calibration method for calibrating an attitude of a camera mounted on a vehicle using markers each arranged vertically and each positioned at a pre-designated height from a road surface. The method includes: a first process including shooting an image of the markers with the camera, thereby generating a two-dimensional image; a second process including converting the two-dimensional image into a bird's eye view image on a specific plane so that the bird's eye view image reflects the height of each of the markers; and a third process including calculating a parameter of the camera based on a position difference between the markers in the specific plane obtained in the second process.

20 Claims, 11 Drawing Sheets

(51) Int. Cl.
  *B60R 1/00* (2006.01)
  *G06T 7/80* (2017.01)
  *H04N 7/18* (2006.01)

(52) U.S. Cl.
  CPC ............... *B60R 2300/402* (2013.01); *G06T 2207/30204* (2013.01); *G06T 2207/30244* (2013.01); *H04N 7/18* (2013.01)

(58) Field of Classification Search
  USPC ........................................ 348/148
  See application file for complete search history.

(56) References Cited

U.S. PATENT DOCUMENTS

| | | | |
|---|---|---|---|
| 2003/0085999 A1 | 5/2003 | Okamoto et al. | |
| 2008/0007619 A1* | 1/2008 | Shima | G06T 7/80 348/118 |
| 2008/0181488 A1 | 7/2008 | Ishii et al. | |
| 2009/0299684 A1* | 12/2009 | Imanishi | G06K 9/00791 702/150 |
| 2010/0194886 A1* | 8/2010 | Asari | G06T 7/85 348/148 |
| 2010/0246901 A1* | 9/2010 | Yang | B60R 1/00 382/107 |
| 2011/0115922 A1* | 5/2011 | Shimizu | G06T 7/80 348/188 |
| 2011/0169954 A1* | 7/2011 | Hongo | B60R 1/00 348/148 |
| 2011/0216201 A1* | 9/2011 | McAndrew | G06T 7/0018 348/148 |
| 2011/0234761 A1* | 9/2011 | Yumiba | B60R 1/00 348/46 |
| 2011/0310250 A1* | 12/2011 | Inui | B60R 1/00 348/175 |
| 2012/0002057 A1* | 1/2012 | Kakinami | G06T 7/002 348/187 |
| 2012/0033087 A1* | 2/2012 | Takeda | G06K 9/00791 348/187 |
| 2013/0100290 A1 | 4/2013 | Sato | |
| 2015/0049193 A1* | 2/2015 | Gupta | G03B 43/00 348/148 |

FOREIGN PATENT DOCUMENTS

| | | | |
|---|---|---|---|
| JP | 2010-121987 A | | 3/2010 |
| JP | 2010-103730 A | | 5/2010 |
| JP | 2010258897 A | * | 11/2010 |

OTHER PUBLICATIONS

Written Opinion of the International Searching Authority dated Oct. 22, 2013 in the corresponding International application No. PCT/JP2013/005276 (and English translation).

* cited by examiner

SHOT IMAGE
(IMAGE COORDINATE SYSTEM)

BIRD'S EYE VIEW IMAGE
(CAMERA COORDINATE SYSTEM)

ACTUAL ARRANGEMENT IN BIRD'S EYE VIEW
(MARKER COORDINATE SYSTEM)

BIRD'S EYE VIEW IMAGE
(MARKER COORDINATE SYSTEM)

ACTUAL CAMERA ARRANGEMENT
(MARKER COORDINATE SYSTEM)

IDEAL CAMERA ARRANGEMENT
(VEHICLE COORDINATE SYSTEM)

ROTATION    TRANSLATION

ACTUAL CAMERA ARRANGEMENT
(VEHICLE COORDINATE SYSTEM)

SHOT IMAGE
(IMAGE COORDINATE SYSTEM)

BIRD'S EYE VIEW IMAGE
(CAMERA COORDINATE SYSTEM)

SYNTHESIZED IMAGE
(CAMERA COORDINATE SYSTEM)

ACTUAL CAMERA ARRANGEMENT
(CAMERA COORDINATE SYSTEM)

IDEAL CAMERA ARRANGEMENT
(VEHICLE COORDINATE SYSTEM)

ROTATION    TRANSLATION

ACTUAL CAMERA ARRANGEMENT
(VEHICLE COORDINATE SYSTEM)

CALIBRATION METHOD AND CALIBRATION DEVICE

CROSS-REFERENCE TO RELATED APPLICATIONS

The present disclosure is a U.S. national stage application of International Patent Application No. PCT/JP2013/005276 filed on Sep. 5, 2013 and is based on Japanese Patent Application No. 2012-220622 filed on Oct. 2, 2012, the contents of which are incorporated herein by reference in their entirety.

TECHNICAL FIELD

The present disclosure relates to a technique for performing measurement concerning mounting of a camera on a vehicle.

BACKGROUND

Known techniques for performing measurement (so-called calibration) concerning mounting of a camera on a vehicle include the following.

For example, in the method disclosed in the patent literature 1 listed below, a plurality of calibration patterns (targets) are placed on the road surface in a predetermined positional relationship, a vehicle is placed near the calibration patterns, and measurement is performed.

In the method disclosed in the patent literature 2 listed below, measurement is performed with a vehicle and a target device which are arranged in a fixed positional relationship using positioning means such as joints and a scope.

PATENT LITERATURE

Patent Literature 1: JP 2009-288152A
Patent Literature 2: JP 2001-285681A

SUMMARY

In the method disclosed in the patent literature 1, to achieve high measurement accuracy, it is necessary to appropriately set the distances from cameras to targets and the angles formed by the cameras with respect to the targets. This requires the targets to be arranged over a wide area on the road surface. As a result, a measurement space (flat space for placing the targets used for measurement) several times as large as the space occupied by the vehicle is required.

In the case of the technique disclosed in the patent literature 2, a target having a height from the road surface is used, so that the space used for measurement can be saved. To perform measurement, however, information about the positional relationship between the vehicle and the target is required. It is, therefore, necessary to physically fix the vehicle and the target in a predetermined positional relationship using joints or to adjust the position of the target using a scope means so as to bring the vehicle and the target into a predetermined positional relationship. This makes measurement cumbersome.

The present disclosure has been made in view of the above problem, and it is an object of the present disclosure to provide a technique which makes measurement easy while saving the space required for measurement.

According to a first example of the present disclosure, a calibration method is for calibrating an attitude of a camera mounted on a vehicle using a plurality of markers each arranged vertically and each positioned at a pre-designated height from a road surface. The calibration method comprises: a first process including shooting an image of the plurality of markers with the camera, thereby generating a two-dimensional image; a second process including converting the two-dimensional image, which is generated in the first process and represents the plurality of markers, into a bird's eye view image on a specific plane so that the bird's eye view image reflects the height of each of the plurality of markers, wherein the specific plane is a road surface or on a plane parallel to the road surface; and a third process including calculating a parameter of the camera based on a position difference between the plurality of markers in the specific plane obtained in the second process.

According to the calibration method including the above processes, the markers (targets) are positioned to have a height above the road surface. This can save the space required for measurement compared with cases in which markers are placed on the road surface. Also according to the calibration method, it is necessary neither to physically fix, using joints, the vehicle and markers to keep them in a predetermined positional relationship nor to adjust the marker positions using a scope means so as to bring the markers into a predetermined positional relationship with the vehicle. Thus, when the calibration method is used, the measurement work to be performed is simpler than in cases where a prior-art technique is used.

According to a second example of the present disclosure, a calibration method is for calibrating an attitude of a camera mounted on a vehicle using a plurality of markers horizontally spaced apart in a pre-designated positional relationship, each marker positioned at a pre-designated distance from a road surface. The calibration method comprises: a first process including shooting an image of the plurality of markers, thereby generating a two-dimensional image; a second process including converting the two-dimensional image, which is generated in the first process and represents the plurality of markers, into a bird's eye view image on a specific plane so that the bird's eye view image reflects the height of each of the plurality of markers, wherein the specific plane is a road surface or a plane parallel to the road surface; and a third process including calculating a parameter of the camera based on a difference between a distance between the plurality of markers represented in the bird's eye view image on the specific plane generated in the second process and a distance between the plurality of markers determined based on the pre-designated positional relationship.

The above calibration device can also achieve effects similar to those achieved by the calibration method of the first example.

According to a third example of the present disclosure, a calibration device is for calibrating an attitude of a camera mounted on a vehicle using a plurality of markers each arranged vertically and each positioned at a pre-designated height from a road surface. The calibration device comprises: an image acquisition unit that acquires a two-dimensional image representing the plurality of markers shot by the camera; a conversion unit that converts the two-dimensional image acquired by the image acquisition unit and representing the plurality of markers into a bird's eye view image on a specific plane so that the bird's eye view image reflects the height of each of the plurality of markers, wherein the specific plane is the road surface or on a plane parallel to the road surface; and a calculation unit that calculates a parameter of the camera based on a position difference between the plurality of markers represented in the specific plane acquired by the conversion unit.

According to the calibration method including the above processes, the markers (targets) are positioned to have a height above the road surface. This can save the space required for measurement compared with cases in which markers are placed on the road surface. Also according to the calibration method, it is necessary neither to physically fix, using joints, the vehicle and markers to keep them in a predetermined positional relationship nor to adjust the marker positions using a scope means so as to bring the markers into a predetermined positional relationship with the vehicle. Thus, when the calibration method is used, the measurement work to be performed is simpler than in cases where a prior-art technique is used.

According to a fourth example of the present disclosure, a calibration device is for calibrating an attitude of a camera mounted on a vehicle using a plurality of markers horizontally spaced apart in a pre-designated positional relationship, each marker having a pre-designated distance from a road surface. The calibration device comprises: an image acquisition unit that acquires a two-dimensional image representing the plurality of markers shot by the camera; a conversion unit that converts the two-dimensional image acquired by the image acquisition unit and representing the plurality of markers into a bird's eye view image on a specific plane so that the bird's eye view image reflects the height of each of the plurality of markers, wherein the specific plane is a road surface or on a plane parallel to the road surface; and a calculation unit that calculates a parameter of the camera based on a difference between a distance between the plurality of markers represented in the bird's eye view image on the specific plane acquired by the conversion unit and a distance between the plurality of markers determined based on the pre-designated positional relationship.

The above calibration device can also achieve effects similar to those achieved by the calibration method of the third example.

BRIEF DESCRIPTION OF DRAWINGS

The above and other objects, features and advantages of the present disclosure will become more apparent from the following detailed description made with reference to the accompanying drawings. In the accompanying drawings.

DETAILED DESCRIPTION

Embodiments of the present disclosure will be described with reference to drawings. The embodiments being described below are, however, merely illustrative and not at all restrictive of other alternative embodiments of the present disclosure. The embodiments of the present disclosure are inclusive of embodiments configured by omitting a part of the configuration of any of the following embodiments as long as objects of the present disclosure are achievable. The embodiments of the present disclosure are also inclusive of embodiments configured by appropriately combining the following embodiments.

<Description of Configuration>

Figure 1:
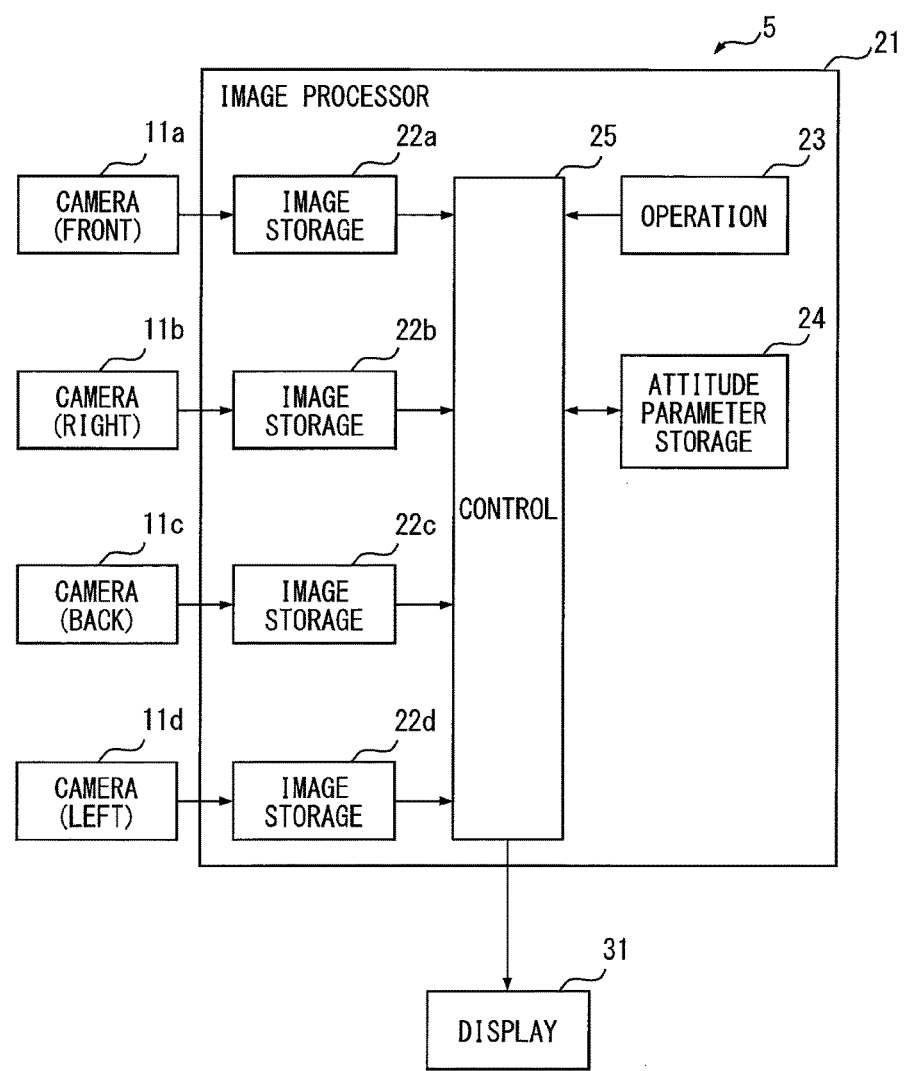
FIG. 1 is a block diagram schematically showing a configuration of an image processing system according to embodiments.

As shown in FIG. 1, an image processing system 5 of embodiments includes cameras 11a to 11d, an image processing device 21, and a display device 31.

Figure 2A:
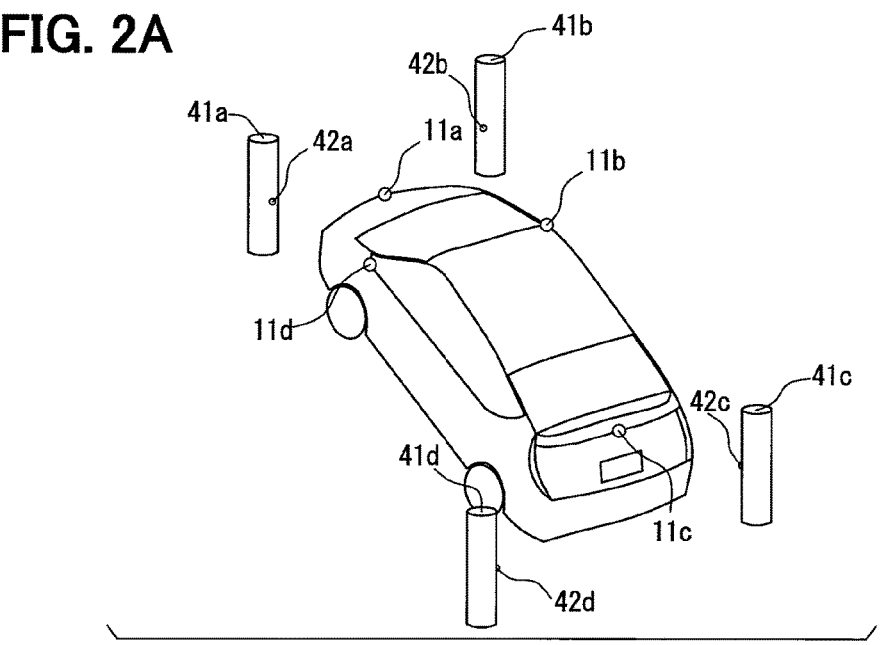
FIG. 2A is an explanatory diagram showing camera positions and a positional relationship between a vehicle and markers according to a first embodiment.

The cameras 11a to 11d are each a wide-angle camera including an image sensor such as a CCD or a CMOS. They each shoot an area around a vehicle and output an image generated by shooting to the image processing device 21 at a predetermined frequency (e.g., at a frequency of 60 frames per second). In the present embodiment, as shown in FIG. 2A, the camera 11a is mounted in a front-end center portion of the vehicle so as to shoot a forward peripheral area of the vehicle, the camera 11b is mounted on a right-side surface of the vehicle (specifically, on the right door mirror) so as to shoot a right-side peripheral area of the vehicle, the camera 11c is mounted in a rear-end center portion of the vehicle so as to shoot a rearward peripheral area of the vehicle, and the camera 11d is mounted on a left-side surface of the vehicle (specifically, on the left door mirror) so as to shoot a left-side peripheral area of the vehicle. In the following description, when the cameras need not be distinguished from one another, each of them may be commonly referred to simply as a "camera 11."

Reverting to FIG. 1, the image processing device 21 includes image storage units 22a to 22d, an operation unit 23, an attitude parameter storage unit 24, and a control unit 25.

The image storage units 22a to 22d include storage devices such as DRAMs and store the images shot by and sequentially outputted from the cameras 11, the images stored in each of the image storage units 22a to 22d totaling in time to a predetermined amount of time (e.g., the last ten seconds). In doing this, the image storage units 22a to 22d store the images outputted from the cameras 11a to 11d, respectively. In the following description, when the image storage units need not be distinguished from one another, each of them may be commonly referred to simply as an "image storage unit 22."

The operation unit 23 includes a touch panel provided on a display screen of the display device 31 and mechanical key switches provided, for example, around the display device 31. The operation unit 23 allows, for example, a driver of the vehicle to input various operating instructions from the operation unit 23.

The attitude parameter storage unit 24 includes a non-volatile storage device, for example, a flash memory. The attitude parameter storage unit 24 stores, for example, attitude parameter values of each camera 11 (horizontal and vertical components of the position of each camera 11 and also the pitch angle, roll angle and yaw angle of the shooting direction of each camera 11), and programs for execution by the control unit 25. The images taken by each camera 11 are processed (e.g., for conversion into bird's eye view images) using the corresponding attitude parameters stored in the attitude parameter storage unit 24. The attitude parameters are also used in determining if there is any camera 11 the mounted position or angle of which has become abnormal, for example, due to vibration of the vehicle making it necessary to issue a warning.

The control unit 25 includes a microcomputer including a CPU, RAM, ROM and I/O device and performs various processing operations by reading programs stored in the attitude parameter storage unit 24.

The display device 31 includes, for example, a liquid crystal display or an organic EL display and can display images shot by the cameras 11 and processed by the image processing device 21.

<Description of Operation of First Embodiment>

Next, the operation of an image processing device 21 of a first embodiment will be described. In the following, description will center on the processing related with the present disclosure, and description will be omitted as to the known processing performed to display images taken by vehicle-mounted cameras of the type being discussed herein (e.g., processing performed to convert images taken by cameras into birds' eye view images and synthesize and display forecasted tracks of wheels on a display device, for example, to support backing of a vehicle into a garage).

In the first embodiment, to calibrate cameras mounted on a vehicle, the vehicle is placed in an area surrounded by four marker poles 41a to 41d as shown in FIG. 2A. The four marker poles 41a to 41d are columnar poles fixed to axially vertically extend from a road surface. The marker poles 41a to 41d include markers 42a to 42d, respectively. The markers 42a to 42d are positioned in longitudinally middle portions of the marker poles 41a to 41d, respectively, to face, each at a same height from the road surface, in the directions toward the vehicle. Namely, the markers 42a to 42d are positioned in a plane parallel to the road surface. The positions in the plane of the markers 42a to 42d are pre-designated. Therefore, the actual positions of the markers 42a to 42d are identified by coordinates in a coordinate system (marker coordinate system) based on a predetermined position. The markers 42a to 42d may be any objects as long as they can be shot by the cameras 11 mounted on the vehicle and their images shot by the cameras 11 can be recognized by the image processing device 21. For example, markers differing in color from the marker poles 41a to 41 or light emitting devices such as LEDs are appropriate for use as the maker poles 41a to 41d.

In the following description, when the marker poles need not be distinguished from one another, each of them may be commonly referred to simply as a "marker pole 41." Also, when the markers need not be distinguished from one another, each of them may be commonly referred to simply as a "marker 42."

Next, with reference to the flowchart shown in FIG. 3, attitude parameter determination processing 1 performed for camera calibration by the image processing device 21 will be described. When personnel in charge of measurement inputs, from the operation unit 23, an instruction for updating the attitude parameters, the attitude parameter determination processing 1 is read into the program control unit 25 from the attitude parameter storage unit 24 and starts being performed. Such an instruction for updating the attitude parameters is issued only after the vehicle is placed as shown in FIG. 2A enabling each camera 11 to shoot two of the marker poles 41 (two of the markers 42). The control unit 25 performs S105 to S140, being described in the following, separately for each of the cameras 11a to 11d, then, after completion of S105 to S140 for each camera, performs S145 and S150 once for all cameras.

Upon starting the attitude parameter determination processing 1, the control unit 25 obtains the latest camera-shot image from a selected one of the image storage units 22 (S105). Namely, the control unit 25 reads image data from one of the image storage units 22a to 22d and lays it out in a RAM, not shown, included in the control unit 25.

Figure 4A:
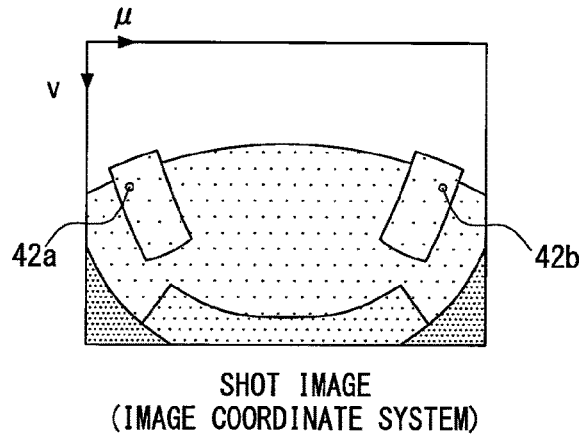
FIG. 4A is a diagram showing an example of a camera-shot image.

The control unit 25 then detects, from the camera-shot image obtained, the coordinates of the markers 42 (5110). Namely, as shown in FIG. 4A, the control unit 25 identifies, in an image coordinate system, the centers of the markers 42a and 42b shown in the camera-shot image. The position of each marker 42 may be identified, for example, by determining a spot representing a large color or luminance difference on the corresponding image or, in cases where each marker 42 includes a light emitting device, by making the light emitting device flash and measuring the difference between an image taken before flashing of the light emitting device and an image taken after flashing of the light emitting device.

Reverting to FIG. 3, the control unit 25 subsequently converts the camera-shot image into a bird's eye view image taking into consideration the heights of the markers 42 (S115). The method of bird's eye view conversion is well known, so that it will not be described herein. The method is described in detail in JP H10-211849A. When performing S115 for the first time after starting execution of the attitude parameter determination processing 1 (when converting a camera-shot image into a bird's eye view image), the attitude parameter values of each camera 11 to be used may be the initial parameter values provided, for example, when the vehicle is shipped from the factory or may be the parameter values stored in the attitude parameter storage unit 24 (the parameter values stored when the attitude parameter determination processing 1 was executed last time). When a camera-shot image is converted into a bird's eye view image, the entire camera-shot image may be converted or only a part of the camera-shot image (e.g., only a portion showing the markers 42) may be converted. It is possible to convert an image of the markers 42 into a bird's eye view image on a horizontal plane of the same height as the markers 42, convert an image of other objects than the markers 42 into a bird's eye view image on the road surface, and synthesize the bird's eye view images into one.

Figure 4B:
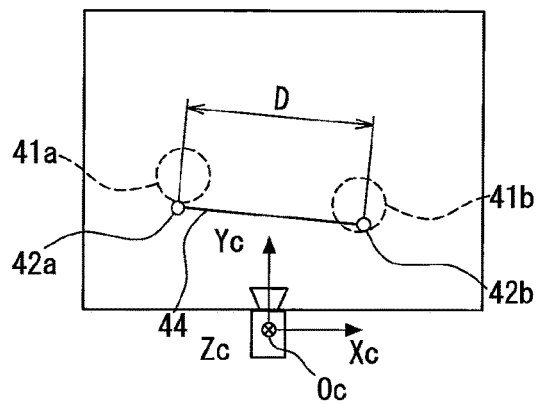
FIG. 4B is a diagram illustrating calculation of a distance between markers represented in a bird's eye view image converted from a camera-shot image.

Subsequently, the control unit 25 calculates distance D between the markers shown in the bird's eye view image thus generated (S120). Namely, as shown in FIG. 4B, distance D between the markers 42a and 42b is calculated based on the coordinates of the marker 42a and the coordinates of the marker 42b in the coordinate system for the target camera 11 (camera coordinate system).

Figure 3:
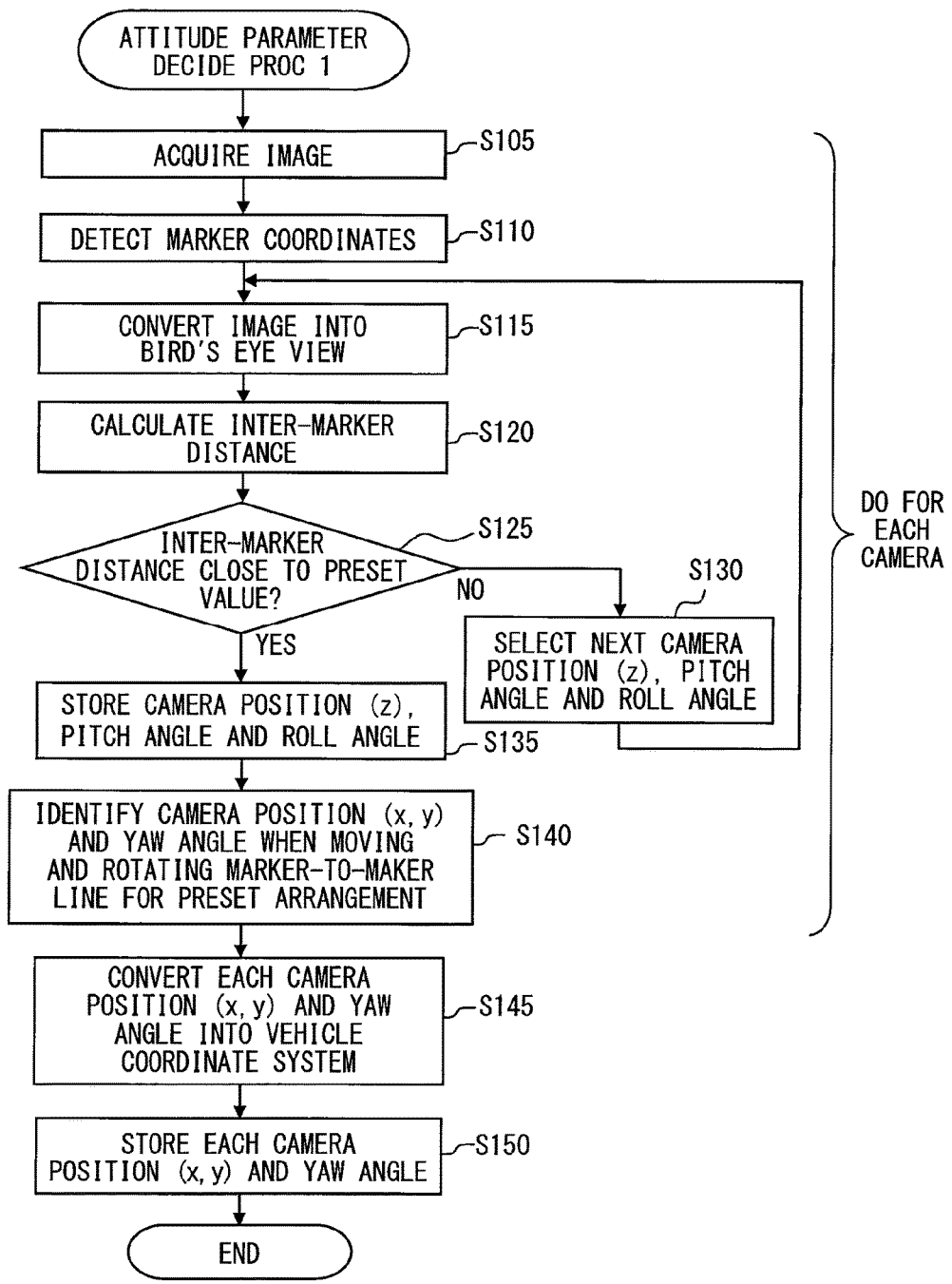
FIG. 3 is a flowchart of attitude parameter determination processing 1.

Reverting to FIG. 3, the control unit 25 determines whether or not the distance D between the markers calculated in S120 can be evaluated to be close enough to a prescribed value (S125). The "prescribed value" represents the actual distance between the markers, i.e. the distance between the two predetermined markers 42 calculated based on their coordinates in the marker coordinate system (see FIG. 4C). The distance D may be evaluated to be "close enough" to a prescribed value, for example, when the ratio of the difference between the distance D between the markers calculated in S120 to the prescribed value is equal to or smaller than a prescribed ratio.

When the control unit 25 determines in S125 that the distance D between the markers calculated in S120 can be evaluated to be close enough to the prescribed value, the control unit 25 advances processing to S135. On the other hand, when the control unit 25 determines that the distance D calculated in S120 cannot be evaluated to be close enough to the prescribed value, the control unit 25 advances processing to S130.

In S130 entered after the distance D between the markers calculated in S120 is evaluated to be not close enough to the prescribed value, the control unit 25 selects candidate values to be the next values of the vertical component (z) of the position of the camera 11 and the pitch angle and roll angle of the shooting direction of the camera 11. These parameters are among the attitude parameters used to generate a bird's eye view image in S115. The candidate values for next use are a set of values of the above elements with at least one of them updated by a small amount (e.g., by an amount equivalent to 0.1% of the amount before the update).

After selecting the candidate values for next use in S130, the control unit 25 returns processing to S115, described above, and again converts the camera-shot image into a bird's eye view image using the attitude parameter values selected as described above.

On the other hand, when processing is advanced to S135 after the distance D between the markers calculated in S120 is evaluated to be close enough to the prescribed value, the control unit 25 stores the vertical component (z) of the position of the camera 11 and the pitch angle and roll angle of the shooting direction of the camera 11 that are used to generate a bird's eye view image in S115 last time in the attitude parameter storage unit 24.

Subsequently, the control unit 25 moves and rotates the bird's eye view image (image represented in the camera coordinate system) obtained by bird's eye view conversion last performed in S115 until the line segment connecting the markers 42 shown in the bird's eye view image is aligned with the line segment connecting the markers 42 in their actual positions (actual marker positions represented in the marker coordinate system). At the same time, the control unit 25 also moves and rotates the origin and coordinate axes of the camera coordinate system in the bird's eye view image obtained in S115. Based on the origin and coordinate axes of the moved and rotated camera coordinate system, the control unit 25 calculates, in the marker coordinate system, the horizontal components (x, y) of the position of the camera 11 and the yaw angle of the shooting direction of the camera 11 (S140). In other words, in S140, the camera position (x, y) and yaw angle are identified with the line segment connecting the markers moved and rotated in accordance with the prescribed marker arrangement. When moving a line segment for alignment with another line segment, the line segment may be moved so as to align the midpoints of the two line segments, but it may also be moved in an alternative manner.

The processing performed in S140 will be described more specifically with reference to FIGS. 4B to 4E.

FIG. 4B shows an image selectively showing, based on a bird's eye view image converted from a camera-shot image, the markers 42a and 42b and poles 41a and 41b and, in the image, a line segment 44 connecting the markers 42a and 42b is defined. The position of the camera 11 used to shoot the image corresponds to the origin Oc of the camera coordinate system and the shooting direction of the camera exists on a Yc-Zc plane.

Figure 4C:
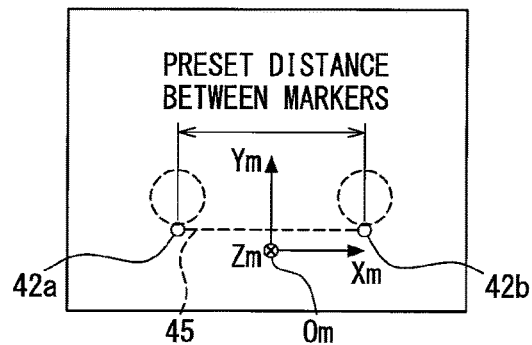
FIG. 4C is a diagram for explaining an actual distance between markers.

FIG. 4C shows the markers 42a and 42b in actual arrangement (actual marker positions). In FIG. 4C, a line segment 45 connecting the markers 42a and 42b is defined. The origin Om of the coordinate system for the markers 42 (marker coordinate system) is shown in FIG. 4C, but the location of the origin Om is not limited to where it is shown in FIG. 4C.

Figure 4D:
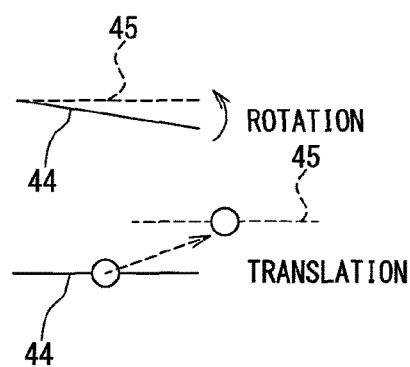
FIG. 4D is a diagram illustrating a manner in which a line segment defined based on measurement-based marker positions is translated and rotated for alignment with a line segment defined based on actual marker positions.

The manner in which the line segment 44 shown in FIG. 4B is translated and rotated for alignment with the line segment 45 shown in FIG. 4C is illustrated in FIG. 4D. When the line segment 44 is translated and rotated as shown in FIG. 4D, the origin Oc and coordinate axes of the camera coordinate system are also moved (the manner in which they are moved is not shown).

Figure 4E:
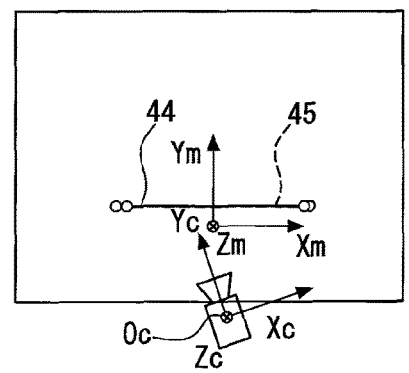
FIG. 4E is a diagram showing the line segments aligned by translation and rotation.

FIG. 4E shows the line segment 44 shown in FIG. 4B after being translated and rotated for alignment with the line segment 45 shown in FIG. 4C. In FIG. 4E, the position of the origin Oc and coordinate axes of the camera coordinate system represented in the marker coordinate system can be checked. The horizontal components (x and y components) of the coordinate position of the origin Oc shown in FIG. 4E represent the horizontal components of the position of the camera 11 in the marker coordinate system. The angle formed between the Yc-Zc plane of the camera coordinate system and the Ym-Zm plane represents the yaw angle of the shooting direction of the camera 11 represented in the marker coordinate system.

Reverting to FIG. 3, the control unit 25 subsequently converts the horizontal components of the position of each camera 11 and the yaw angle of the shooting direction of each camera 11 calculated in S140 based on the marker coordinate system into the horizontal components of the position of each camera 11 and the yaw angle of the shooting direction of each camera 11 based on the vehicle coordinate system (S145). This conversion processing will be described with reference to FIGS. 5A to 5D.

Figure 5A:
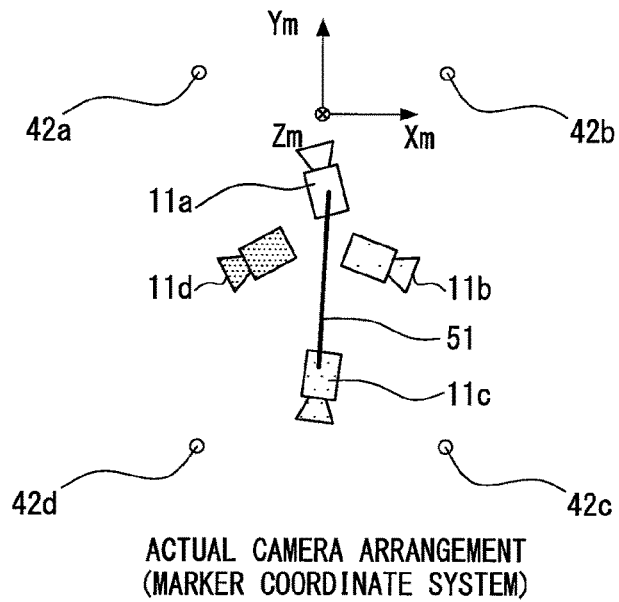
FIG. 5A is a diagram conceptually showing camera positions determined by measurement (marker coordinate system)

FIG. 5A conceptually shows the positions of the cameras 11a to 11d in the marker coordinate system based on the results of performing S105 through S140 for each of the cameras 11a to 11d. In the example shown in FIG. 5A, the camera 11a mounted in a front-end center portion of the vehicle and the camera 11c mounted in a rear-end center portion of the vehicle are selected and a line segment 51 connecting the positions of the two cameras is defined. The cameras to be selected are not limited to the above two. A different combination of cameras may be selected.

Figure 5B:
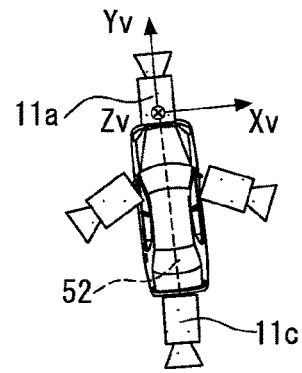
FIG. 5B is a diagram conceptually showing a coordinate system based on a vehicle including ideally positioned cameras.

FIG. 5B conceptually shows a coordinate system (vehicle coordinate system) based on a front-end center portion of a vehicle including cameras in an ideal arrangement. The vehicle coordinate system has an origin at the position of the camera 11a mounted in the front-end center portion of the vehicle, a Y axis horizontally extending forwardly of the vehicle, an X axis horizontally extending rightwardly of the vehicle, and a Z axis upwardly (vertically) extending from the vehicle. In this example, too, the camera 11a mounted in the front-end center portion of the vehicle and the camera 11c mounted in a rear-end center portion of the vehicle are selected and a line segment 52 connecting the two cameras is defined.

With the above vehicle coordinate system provided, the line segment 51 shown in FIG. 5A is rotated and translated until the line segment 51 is aligned with the line segment 52 defined in FIG. 5B. At this time, the horizontal components of the position of each camera 11 and the yaw angle of the shooting direction of each camera 11 are also rotated and translated correspondingly. This converts the horizontal components of the position of each camera 11 and the yaw angle of the shooting direction of each camera 11 based on the marker coordinate system into those based on the vehicle coordinate system.

Figure 5C:
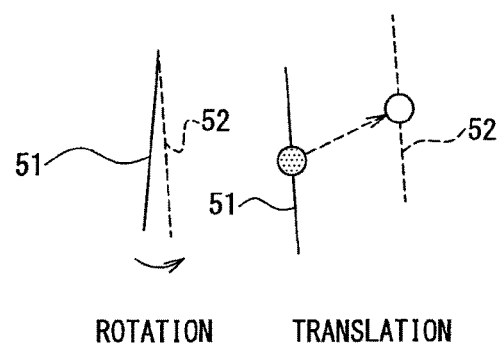
FIG. 5C is a diagram illustrating a manner in which a line segment defined based on measurement-based camera positions is translated and rotated for alignment with a line segment defined based on ideal camera positions.

FIG. 5C shows the manner in which the ling segment 51 shown in FIG. 5A is rotated and translated to be aligned with the line segment 52 shown in FIG. 5B. It is conceivable to move the line segment 51 such that the midpoint of the line segment 51 is aligned with the midpoint of the line segment 52, but the line segment 51 may be moved in an alternative manner.

Figure 5D:
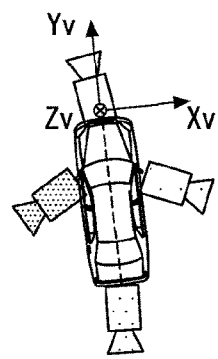
FIG. 5D is a diagram conceptually showing results of conversion of the horizontal components of the position of each camera and the yaw angle of the shooting direction of each camera from a marker coordinate system to a vehicle coordinate system.

FIG. 5D conceptually shows the results of converting the horizontal components of the position of each camera 11 and the yaw angle of the shooting direction of each camera 11 based on the marker coordinate system into those based on the vehicle coordinate system. Comparing FIG. 5D and FIG. 5B, it is shown that each camera shown in FIG. 5D is oriented differently from its orientation shown in FIG. 5B. Thus, it is confirmed that the position of each camera 11 shown in FIG. 5A can be identified in the vehicle coordinate system.

Reverting to FIG. 3, the control unit 25 subsequently stores the horizontal components of the position of each camera 11 and the yaw angle of the shooting direction of each camera 11 based on the vehicle coordinate system as determined by conversion in S145 in the attitude parameter storage unit 24 (S150). The control unit 25 then ends the processing (attitude parameter determination processing 1).

<Effects of First Embodiment>

The operation of the image processing device 21 according to the first embodiment has been described. According to the first embodiment, the markers 42 are positioned to have a height above the road surface. This can save the space required for measurement compared with cases in which markers are placed on the road surface. Also according to the first embodiment, it is necessary neither to physically fix, using joints, the vehicle and markers to keep them in a predetermined positional relationship nor to adjust the marker positions using a scope means so as to bring the markers into a predetermined positional relationship with the vehicle. Thus, the measurement work to be performed is simple according to the first embodiment compared with cases in which a prior-art technique is used.

Furthermore, the image processing device 21 according to the first embodiment can calculate the values of all parameters (positions, pitch angles, roll angles and yaw angles) of all cameras 11 mounted on the vehicle.

<Description of Operation of Second Embodiment>

Next, the operation of an image processing device 21 of a second embodiment will be described. The following description of the second embodiment will center on aspects of the second embodiment different from those of the first embodiment, and descriptions of operations identical between the first and second embodiments will be omitted.

Figure 2B:
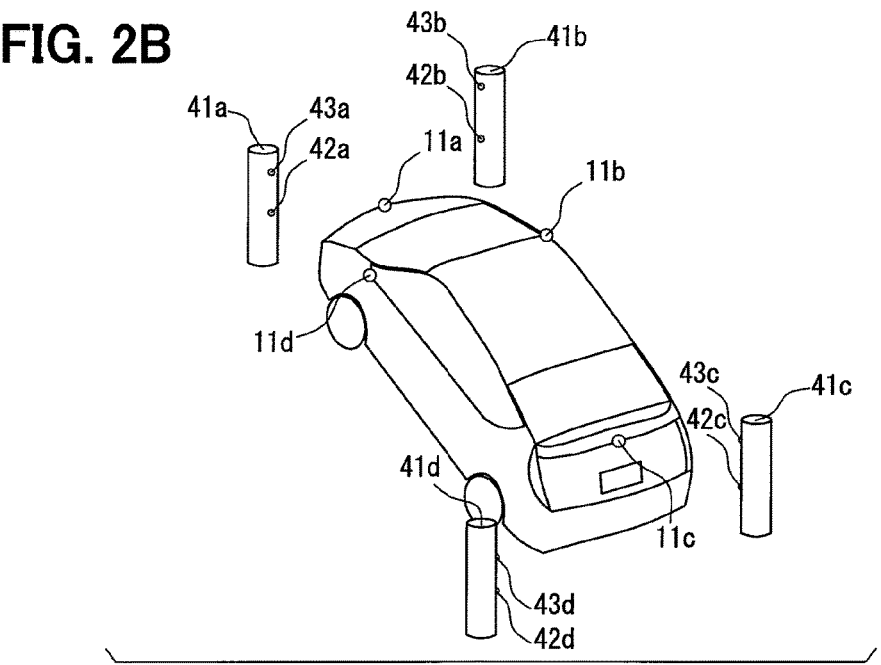
FIG. 2B is an explanatory diagram showing camera positions and a positional relationship between a vehicle and markers according to a second embodiment.

In the second embodiment, too, to calibrate cameras mounted on a vehicle, the vehicle is placed in an area surrounded by four marker poles 41a to 41d as shown in FIG. 2B. The four marker poles 41a to 41d include markers 42a to 42d, respectively. The markers 42a to 42d (hereinafter also referred to as "lower markers") are positioned in longitudinally middle portions of the marker poles 41a to 41d, respectively, to face, at a same height from the road surface, in the directions toward the vehicle. The four marker poles 41a to 41d also include markers 43a to 43d, respectively. The markers 43a to 43d (hereinafter also referred to as "upper markers") are positioned in portions near the upper ends of the marker poles 41a to 41d, respectively, to face, at a same height from the road surface, in the directions toward the vehicle. These markers 42a to 42d and 43a to 43d are vertically aligned on the respective marker poles. Unlike in the first embodiment, the positions of the markers 42a to 42d and 43a to 43d need not be pre-identified in a specific coordinate system, but their height from the road surface is predetermined.

In the following description, when the markers 42a to 42d need not be distinguished from one another, each of them may be commonly referred to simply as a "marker 42" (or as a "lower marker 42"). Similarly, when the markers 43a to 43d need not be distinguished from one another, each of them may be commonly referred to simply as a "marker 43" (or as an "upper marker 43").

Next, with reference to the flowchart shown in FIG. 6, attitude parameter determination processing 2 performed by the image processing device 21 for camera calibration will be described. When personnel in charge of measurement inputs, from the operation unit 23, an instruction for updating the attitude parameters, the attitude parameter determination processing 2 is read into the program control unit 25 from the attitude parameter storage unit 24 and starts being performed. Such an instruction for updating the attitude parameters is issued only after the vehicle is placed as shown in FIG. 2B enabling each camera 11 to shoot the markers positioned on two of the marker poles 41. The control unit 25 performs S205 to S235, being described in the following, separately for each of the cameras 11a to 11d, then, after completion of S205 to S235 for each camera, performs S240 to S250 once for all cameras.

Upon starting the attitude parameter determination processing 2, the control unit 25 obtains the latest camera-shot image from a selected one of the image storage units 22 (S205).

Figure 7A:
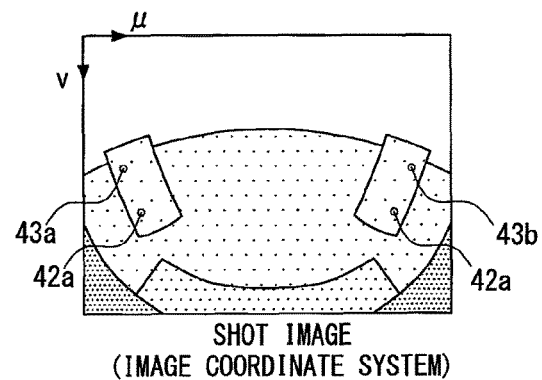
FIG. 7A is a diagram showing an example of a camera-shot image.

The control unit 25 then detects, from the camera-shot image obtained, the coordinates of the lower markers 42 and upper markers 43 (S210). Namely, as shown in FIG. 7A, the control unit 25 identifies, in an image coordinate system, the centers of the markers 42a, 42b, 43a and 43b shown in the camera-shot image.

Reverting to FIG. 6, the control unit 25 subsequently converts the camera-shot image into a bird's eye view image (S215). This is done by taking into consideration the heights of the lower markers 42 and upper markers 43.

Figure 7B:
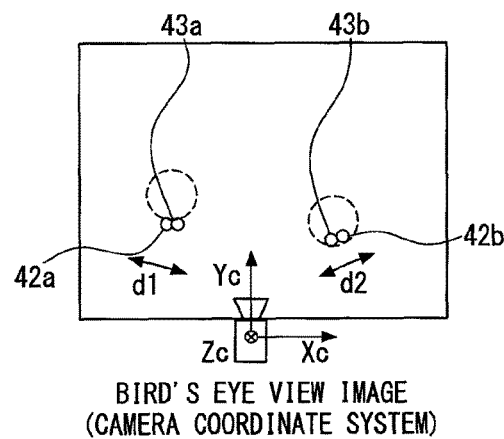
FIG. 7B is a diagram illustrating calculation of a position difference between markers on each pole represented in a bird's eye view image converted from a camera-shot image.

Subsequently, the control unit 25 calculates the position difference, in the bird's eye view image, between the lower marker 42 and the upper marker 43 on each pole (S220). For example, as shown in FIG. 7B, distance d1 between the positions of the lower marker 42a and upper marker 43a and distance d2 between the positions of the lower marker 42b and upper marker 43b are calculated in a coordinate system (camera coordinate system) based on the camera 11a used to shoot the image.

Figure 6:
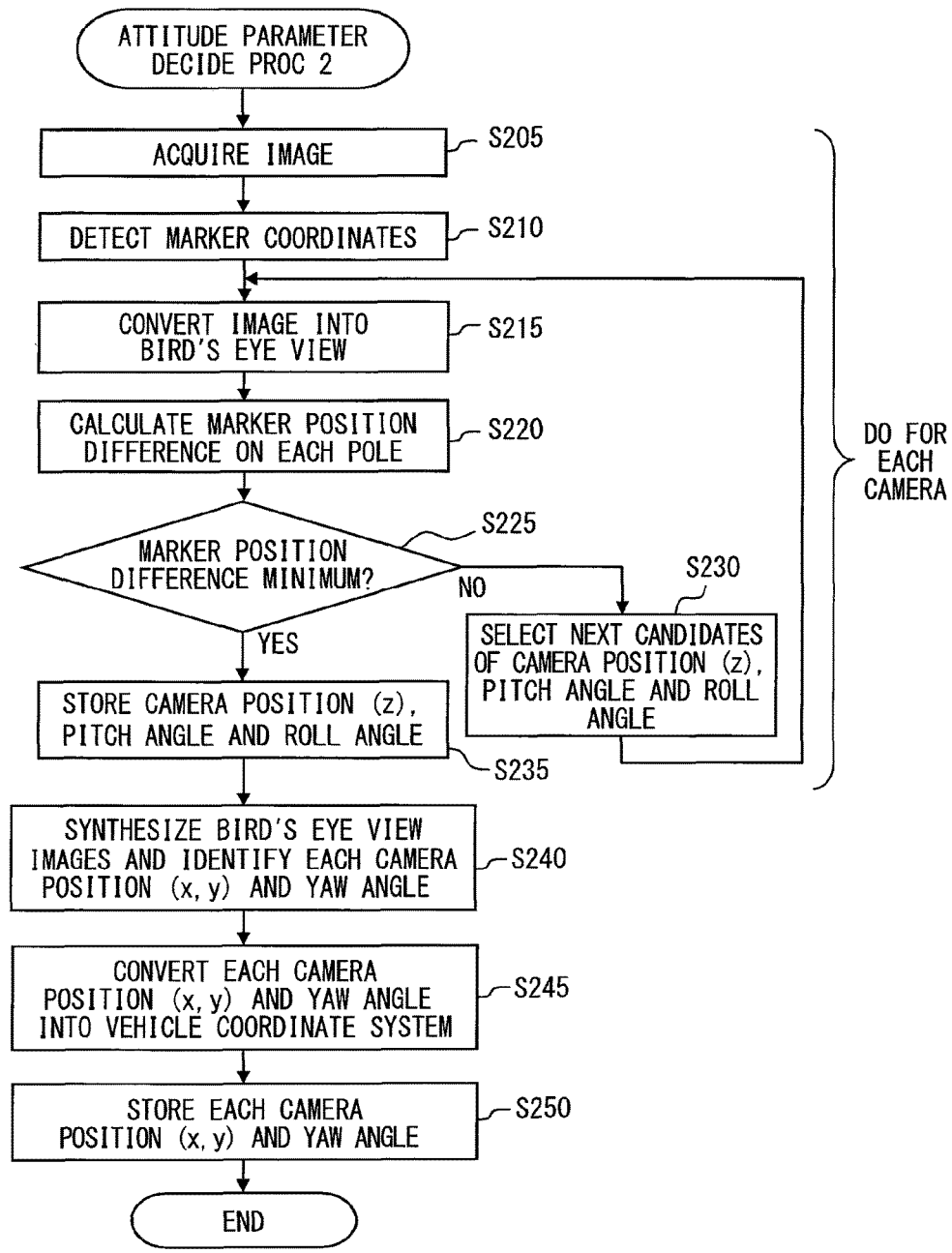
FIG. 6 is a flowchart of attitude parameter determination processing 2.

Reverting to FIG. 6, the control unit 25 then determines whether or not the distance between the positions of the lower marker 42 and upper marker 43 on each pole can be evaluated as a minimum (S225). The "minimum" is ideally preferably 0, but it may be a value infinitely proximate to 0 with an error taken into consideration.

When it is determined in S225 that the distance between the positions of the lower marker 42 and upper marker 43 on each pole measured in S220 can be evaluated as a minimum, the control unit 25 advances processing to S235. When, on the other hand, it is determined in S225 that the distance between the positions of the lower marker 42 and upper marker 43 on each pole measured in S220 cannot be evaluated as a minimum, the control unit 25 advances processing to S230.

In S230 entered when it is determined in S225 that the distance between the positions of the lower marker 42 and upper marker 43 on each pole measured in S220 cannot be evaluated as a minimum, the control unit 25 selects candidate values to be the next values of the vertical component (z) of the position of the camera 11 and the pitch angle and roll angle of the shooting direction of the camera 11. These elements are among the attitude parameters used to generate a bird's eye view image in S215. The candidate values for next use are a set of values of the above elements with at least one of them updated by a small amount (e.g., by an amount equivalent to 0.1% of the amount before the update).

After selecting the candidate values for next use in S230, the control unit 25 returns processing to S215 described above and again converts the camera-shot image into a bird's eye view image using the attitude parameter values selected as described above.

In S235 entered when it is determined in S225 that the distance between the positions of the lower marker 42 and upper marker 43 on each pole measured in S220 can be evaluated as a minimum, the control unit 25 stores the vertical component (z) of the position of the camera 11 and the pitch angle and roll angle of the shooting direction of the camera 11 that are used to generate a bird's eye view image in S215 last time in the attitude parameter storage unit 24.

The control unit 25 performs the above processing (S205 to S235) for each of the cameras 11a to 11d, and, after obtaining bird's eye view images (latest bird's eye view images generated by bird's eye view conversion performed in S215) corresponding to all cameras 11, starts the processing of S240.

The control unit 25 synthesizes the bird's eye view images (images in the respective camera coordinate systems) corresponding to all cameras 11 into one (S240). This is done by translating and rotating the different images for alignment such that the same markers shown in the different images are aligned, respectively. At this time, the origins and coordinate axes of the camera coordinate systems of the cameras 11 except for one selected as a reference camera coordinate system are also translated and rotated. In other words, in the camera coordinate system of one of the cameras 11, the bird's eye view images corresponding to the other cameras 11 are synthesized and the position (x, y) and yaw angle of each camera are identified.

Figure 7C:
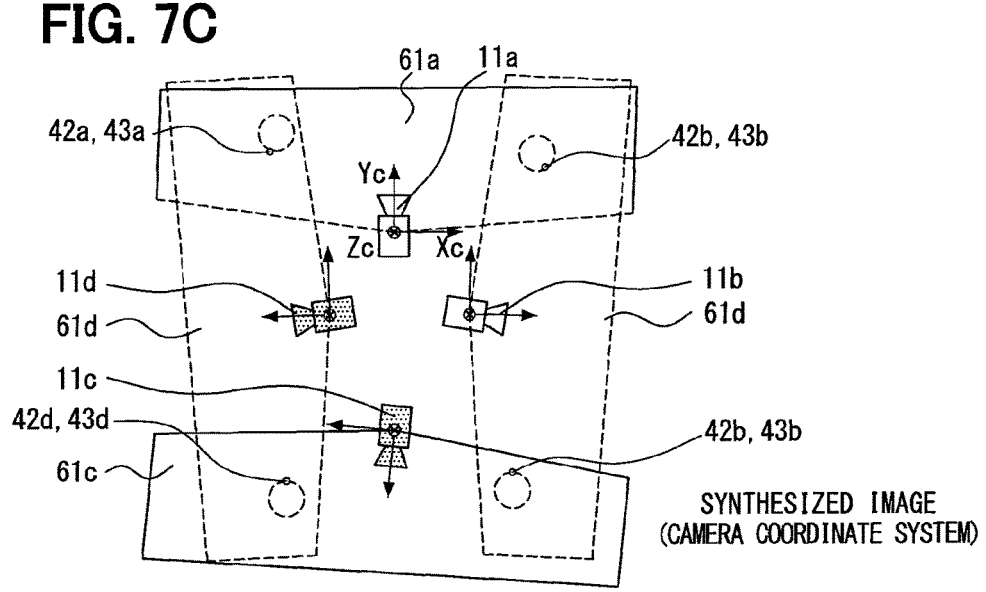
FIG. 7C is a diagram which illustrates synthesizing bird's eye view images into one using a camera coordinate system of one of the bird's eye view images and identifying the horizontal components of the position of each camera and the yaw angle of the shooting direction of each camera.

Image synthesis will be described with reference to FIG. 7C. A forward-area bird's eye view image 61a is a bird's eye view image generated based on an image shot by the camera 11a mounted in a front-end center portion of the vehicle; a right-area bird's eye view image 61b is a bird's eye view image generated based on an image shot by the camera 11b mounted in a right-side portion of the vehicle; a rearward-area bird's eye view image 61c is a bird's eye view image generated based on an image shot by the camera 11c mounted in a rear-end center portion of the vehicle; and a left-area bird's eye view image 61d is a bird's eye view image generated based on an image shot by the camera 11d mounted in a left-side portion of the vehicle. In the example shown in FIG. 7C, using the camera coordinate system of the forward-area bird's eye view image 61a as a reference camera coordinate system, the different images are synthesized into one by translating and rotating the other bird's eye view images for alignment such that the same markers shown on the different images are aligned, respectively. At this time, the horizontal components of the position of each camera 11 and the yaw angle of the shooting direction of each camera 11 corresponding to each bird's eye view image are also translated and rotated. This makes it possible to calculate the horizontal components of the shooting position of each camera 11 and the yaw angle of the shooting direction of each camera 11 based on the camera coordinate system of the forward-area bird's eye view image 61a.

Reverting to FIG. 6, the control unit 25 subsequently converts the horizontal components of the position of each camera 11 and the yaw angle of the shooting direction of each camera 11 calculated in S240 based on the camera coordinate system for each camera 11 into the horizontal components of the position of each camera 11 and the yaw angle of the shooting direction of each camera 11 in the vehicle coordinate system (S245). This conversion will be described with reference to FIGS. 8A to 8D.

Figure 8A:
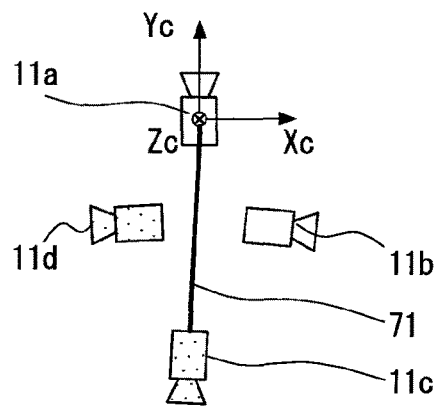
FIG. 8A is a diagram conceptually showing the position of each camera determined by measurement (camera coordinate system)

FIG. 8A conceptually shows the horizontal components of the position of each camera 11 and the yaw angle of the shooting direction of each camera 11 in the camera coordinate system. In the example shown in FIG. 8A, the camera 11a mounted in a front-end center portion of the vehicle and the camera 11c mounted in a rear-end center portion of the vehicle are selected and a line segment 71 connecting the positions of the two cameras is defined. The cameras to be selected are not limited to the above two. A different combination of cameras may be selected.

Figure 8B:
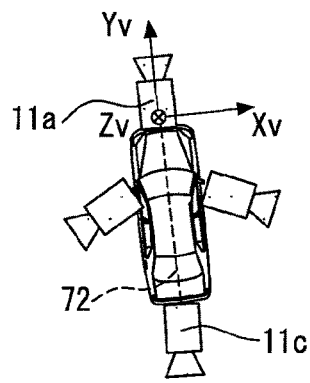
FIG. 8B is a diagram conceptually showing a coordinate system based on a vehicle including ideally positioned cameras.

FIG. 8B conceptually shows a coordinate system (vehicle coordinate system) based on a front-end center portion of a vehicle including cameras in an ideal arrangement. The vehicle coordinate system has an origin at the position of the camera 11a mounted in the front-end center portion of the vehicle, a Y axis horizontally extending forwardly of the vehicle, an X axis horizontally extending rightwardly of the vehicle, and a Z axis upwardly (vertically) extending from the vehicle. In this example, too, the camera 11a mounted in the front-end center portion of the vehicle and the camera 11c mounted in a rear-end center portion of the vehicle are selected and a line segment 72 connecting the positions of the two cameras is defined.

With the above vehicle coordinate system provided, the line segment 71 shown in FIG. 8A is rotated and translated until the line segment 71 is aligned with the line segment 72 defined in FIG. 8B, causing the horizontal components of the position of each camera 11 and the yaw angle of the shooting direction of each camera 11 to be correspondingly rotated and translated. By doing this, the horizontal components of the position of each camera 11 and the yaw angle of the shooting direction of each camera 11 are converted into those based on the vehicle coordinate system.

Figure 8C:
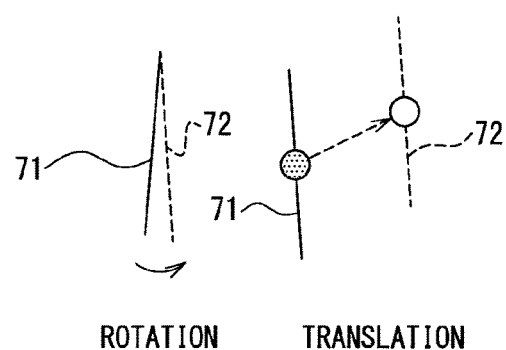
FIG. 8C is a diagram illustrating a manner in which a line segment defined based on measurement-based camera positions is translated and rotated for alignment with a line segment defined based on ideal camera positions.

FIG. 8C shows the manner in which the line segment 71 shown in FIG. 8A is rotated and translated to be aligned with the line segment 72 shown in FIG. 8B. It is conceivable to move the line segment 71 such that the midpoint of the line segment 71 is aligned with the midpoint of the line segment 72, but the line segment 71 may be moved in an alternative manner.

Figure 8D:
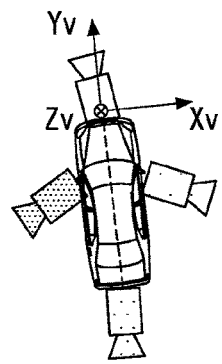
FIG. 8D is a diagram conceptually showing results of conversion of the horizontal components of the position of each camera and the yaw angle of the shooting direction of each camera from a camera coordinate system to a vehicle coordinate system.

FIG. 8D conceptually shows the results of converting the horizontal components of the position of each camera 11 and the yaw angle of the shooting direction of each camera 11 based on the camera coordinate system into those based on the vehicle coordinate system. Comparing FIG. 8D and FIG. 8B, it is shown that each camera shown in FIG. 8D is oriented differently from its orientation shown in FIG. 8B. Thus, it is confirmed that the position of each camera 11 shown in FIG. 8A can be identified in the vehicle coordinate system.

Reverting to FIG. 6, the control unit 25 subsequently stores the horizontal components of the position of each camera 11 and the yaw angle of the shooting direction of each camera 11 based on the vehicle coordinate system as determined by image conversion in S245 in the attitude parameter storage unit 24 (S250). The control unit 25 then ends the processing (attitude parameter determination processing 2).

<Effects of Second Embodiment>

The operation of the image processing device 21 according to the second embodiment has been described. According to the second embodiment, the markers 42 and 43 are positioned to have a height above the road surface. This can save the space required for measurement compared with cases in which markers are placed on the road surface. Also according to the second embodiment, it is necessary neither to physically fix, using joints, the vehicle and markers to keep them in a predetermined positional relationship nor to adjust the marker positions using a scope means so as to bring the markers into a predetermined positional relationship with the vehicle. Thus, the measurement work to be performed is simple according to the second embodiment compared with cases in which a prior-art technique is used.

Furthermore, the image processing device 21 according to the second embodiment can calculate the values of all parameters (positions, pitch angles, roll angles and yaw angles) of all cameras 11 mounted on the vehicle.

Also, according to the second embodiment compared with the first embodiment, the positions of the marker poles 41 need not be pre-designated (need not be strictly in predetermined positions). It is, therefore, possible to set up the marker poles 41 before performing measurement without necessity to keep them set up in place. Thus, measurement can be performed more easily than in the first embodiment.

<Other Embodiments>

(1) Even though, in the above embodiments, all the attitude parameters of the cameras 11 are calculated, it is not necessarily required to calculate all the attitude parameters. For example, an alternative approach may be used in which only the pitch angle and yaw angle of the shooting direction of each camera 11 are calculated.

(2) The values of the attitude parameters to be stored in the attitude parameter storage unit 24 need not necessarily be those based on the coordinate systems described in connection with the above embodiments. The attitude parameters converted into those based on an alternative coordinate system may also be stored in the attitude parameter storage unit 24.

(3) Even though, in the above embodiments, the attitude parameter determination processing is performed entirely by the control unit 25 of the image processing device 21 mounted in the vehicle, the attitude parameter determination processing may partly be performed by another device different from the image processing device 21. In such a case, the another device may be mounted in a location (outside the vehicle) different from where the image processing device 21 is mounted, thereby allowing the image processing device 21 to perform the attitude parameter determination processing while communicating with the another device via a communication line.

In the above embodiments, S105 and S205 performed by the control unit 25 correspond to an example of a first process and an image acquisition unit (or means). S115 and S215 performed by the control unit 25 correspond to an example of a second process and conversion (or means). S140, S145, S240 and S245 performed by the control unit 25 correspond to an example of a third process and a calculation unit (or means).

According to the present disclosure, various forms of calibration methods and calibration devices can be provided.

For example, a calibration method according to the first example of the present disclosure is for calibrating an attitude of a camera mounted on a vehicle using a plurality of markers each arranged vertically and each positioned at a pre-designated height from a road surface. The calibration method comprises: a first process including shooting an image of the plurality of markers with the camera, thereby generating a two-dimensional image; a second process including converting the two-dimensional image, which is generated in the first process and represents the plurality of markers, into a bird's eye view image on a specific plane so that the bird's eye view image reflects the height of each of the plurality of markers, wherein the specific plane is a road surface or on a plane parallel to the road surface; and a third process including calculating a parameter of the camera based on a position difference between the plurality of markers in the specific plane obtained in the second process.

According to the calibration method including the processes described above, the markers (targets) are positioned to have a height above the road surface. This can save the space required for measurement compared with cases in which markers are placed on the road surface. Also according to the calibration method, it is necessary neither to physically fix, using joints, the vehicle and markers to keep them in a predetermined positional relationship nor to adjust the marker positions using a scope means so as to bring the markers into a predetermined positional relationship with the vehicle. Thus, when the calibration method is used, the measurement work to be performed is simpler than in cases where a prior-art technique is used.

In the third process, the parameter includes at least one of a vertical component of a position of the camera, a pitch angle of the camera, and a roll angle of the camera. Such a parameter can be accurately calculated in the third process.

The vehicle may be mounted with either a single camera or a plurality of cameras. When cameras are mounted, the three processes may be performed as follows (third example). In the first process, the plurality of markers are shot by each camera and the two-dimensional image is generated for each camera. In the second process, each of the two-dimensional images generated in the first process is converted into the bird's eye view image. In the third process, at least either a yaw angle of each camera or a horizontal component of the position of each camera is further calculated as the parameter of the each camera, so that a particular marker shot by one camera have the same position in the converted bird's eye view image as the particular marker shot by another camera.

The calibration method including the above processes makes it possible to calculate at least either the yaw angle of the position of each of cameras mounted on a vehicle or the horizontal components of the position of each camera in a same coordinate system, while saving the space required for measurement and making measurement processing easier.

A calibration method of a fourth example of the present disclosure is for calibrating an attitude of a camera mounted on a vehicle using a plurality of markers horizontally spaced apart in a pre-designated positional relationship, each marker positioned at a pre-designated distance from a road surface. The calibration method comprises a first process including shooting an image of the plurality of markers, thereby generating a two-dimensional image; a second process including converting the two-dimensional image, which is generated in the first process and represents the plurality of markers, into a bird's eye view image on a specific plane so that the bird's eye view image reflects the height of each of the plurality of markers, wherein the specific plane is a road surface or a plane parallel to the road surface; and a third process including calculating a parameter of the camera based on a difference between a distance between the plurality of markers represented in the bird's eye view image on the specific plane generated in the second process and a distance between the plurality of markers determined based on the pre-designated positional relationship.

According to the calibration method including the processes described above, the markers (targets) are positioned to have a height above the road surface. This can save the space required for measurement compared with cases in which markers are placed on the road surface. Also according to the calibration method, it is necessary neither to physically fix, using joints, the vehicle and markers to keep them in a predetermined positional relationship nor to adjust the marker positions using a scope means so as to bring the markers into a predetermined positional relationship with the vehicle. Thus, when the calibration method is used, the measurement work to be performed is simpler than in cases where a prior-art technique is used.

In the third process, the parameter may include at least one of a vertical component of a position of the camera, a pitch angle of the camera, and a roll angle of the camera (fifth example). Such a parameter can be accurately calculated in the third process.

Even though, the parameter value calculated in the third process may be the value of only one of the vertical component, pitch angle and roll angle of the position of each camera, other parameter values may also be calculated as follows. Namely, at least either a yaw angle of the camera or a horizontal component of the position of the camera is further calculated as the parameter of the camera based on a position difference between a line segment connecting the plurality of markers represented in the specific plane and a line segment connecting the plurality of markers determined based on the pre-designated positional relationship (sixth example). This calculation is made based on the position difference between a line segment connecting a plurality of markers that are, in the second process, represented on the road surface or plane and a line segment connecting the markers based on a pre-designated positional relationship.

The calibration method including the above processes makes it possible to calculate at least either the yaw angle of the position of each of cameras mounted on a vehicle or the horizontal components of the position of each camera in a same coordinate system, while saving the space required for measurement and simplifying measurement processing.

The vehicle may be mounted with either a single camera or a plurality of cameras. When cameras are mounted, the first to the third process may be performed for each camera (seventh example).

The calibration method including the above processes makes it possible to calculate parameter values of each of cameras mounted on a vehicle, while saving the space required for measurement and making measurement processing easier.

According to an eighth example of the present disclosure, a calibration device for calibrating an attitude of a camera mounted on a vehicle using a plurality of markers each arranged vertically and each positioned at a pre-designated height from a road surface comprises: an image acquisition unit that acquires a two-dimensional image representing the plurality of markers shot by the camera; a conversion unit that converts the two-dimensional image acquired by the image acquisition unit and representing the plurality of markers into a bird's eye view image on a specific plane so that the bird's eye view image reflects the height of each of the plurality of markers, wherein the specific plane is the road surface or on a plane parallel to the road surface; and a calculation unit that calculates a parameter of the camera based on a position difference between the plurality of markers represented in the specific plane acquired by the conversion unit.

The parameter calculated by the calculation unit may include at least one of a vertical component of a position of the camera, a pitch angle of the camera, and a roll angle of the camera (ninth example).

Also, the calibration device may include a plurality of cameras mounted on the vehicle and may be configured as follows (tenth example). The image acquisition unit acquires a plurality of two-dimensional images shot by each of the plurality of cameras, each two-dimensional image representing the plurality of markers. The conversion unit converts each of the two-dimensional images acquired by the image acquisition unit into a bird's eye view image. The calculation unit calculates a parameter of each of the plurality of camera, so that a particular marker shot by one camera have the same position in the converted bird's eye view image as that shot by another camera, wherein the parameter of each camera includes at least either a yaw angle of the camera or a horizontal component of the position of the camera.

The above calibration device can achieve effects similar to those achieved in the above first to third examples.

According to an eleventh example of the present disclosure, a calibration device for calibrating an attitude of a camera mounted on a vehicle using a plurality of markers horizontally spaced apart in a pre-designated positional relationship, each marker having a pre-designated distance from a road surface, comprises: an image acquisition unit that acquires a two-dimensional image representing the plurality of markers shot by the camera; a conversion unit that converts the two-dimensional image acquired by the image acquisition unit and representing the plurality of markers into a bird's eye view image on a specific plane so that the bird's eye view image reflects the height of each of the plurality of markers, wherein the specific plane is a road surface or on a plane parallel to the road surface; and a calculation unit that calculates a parameter of the camera based on a difference between a distance between the plurality of markers represented in the bird's eye view image on the specific plane acquired by the conversion unit and a distance between the plurality of markers determined based on the pre-designated positional relationship.

The parameter calculated by the calculation unit includes at least one of a vertical component of a position of the camera, a pitch angle of the camera, and a roll angle of the camera.

Also, in the calibration device, the calculation unit (25, S140, S145) may further calculate at least either a yaw angle of the camera or a horizontal component of the position of the camera as the parameter of the camera based on a position difference between a line segment connecting the plurality of markers represented in the specific plan and a line segment connecting the plurality of markers determined based on the pre-designated positional relationship (thirteenth example).

Also, the calibration device may include a plurality of cameras mounted on the vehicle and may be configured such that the units perform their operations for each camera (fourteenth example).

The above calibration device can achieve effects similar to those achieved in the above fourth to seventh examples.

Exemplary embodiments and configurations according to the present disclosure have been described, but the embodiments and configurations of the present disclosure are not limited to the above exemplary embodiments and configurations. Embodiments and configurations realized by appropriately combining technical elements disclosed in different embodiments and configurations also fall in the range of embodiments and configurations according to the present disclosure.

The invention claimed is:

1. A calibration method for calibrating an attitude of a camera mounted on a vehicle using a plurality of markers each arranged vertically and each positioned at pre-designated height from a road surface, the calibration method comprising:
a first process including shooting an image of the plurality of markers with the camera, thereby generating a two-dimensional image;
a second process including converting the two-dimensional image, which is generated in the first process and represents the plurality of markers, into a bird's eye view image on a specific plane, the bird's eye view image reflecting the height of each of the plurality of markers, wherein the specific plane is a road surface or on a plane parallel to the road surface; and
a third process including calculating a parameter of the camera based on a position difference between the plurality of markers in the specific plane obtained in the second process,
wherein
a plurality of columnar marker poles are vertically extended from a road surface, and
markers are positioned on the columnar marker poles so as to face in directions toward the vehicle, each marker at a pre-designated height from the road surface.

2. The calibration method according to claim 1, wherein the parameter calculated in the third process includes at least one of a vertical component of a position of the camera, a pitch angle of the camera, and a roll angle of the camera.

3. The calibration method according to claim 2, wherein:
the vehicle is mounted with a plurality of the cameras;
in the first process, the plurality of markers are shot by each camera and the two-dimensional image is generated for each camera;
in the second process, each of the two-dimensional images generated in the first process is converted into the bird's eye view image; and
in the third process, at least either a yaw angle of each camera or a horizontal component of the position of each camera is further calculated as the parameter of the each camera, a particular marker shot by one camera having the same position in the converted bird's eye view image as the particular marker shot by another camera.

4. A calibration method for calibrating an attitude of a camera mounted on a vehicle using a plurality of markers horizontally spaced apart in a pre-designated positional relationship, each marker positioned at a pre-designated distance from a road surface, the calibration method comprising:
a first process including shooting an image of the plurality of markers, thereby generating a two-dimensional image;
a second process including converting the two-dimensional image, which is generated in the first process and represents the plurality of markers, into a bird's eye view image on a specific plane, the bird's eye view image reflecting the height of each of the plurality of markers, wherein the specific plane is a road surface or a plane parallel to the road surface; and
a third process including calculating a parameter of the camera based on a difference between
a distance between the plurality of markers represented in the bird's eye view image on the specific plane generated in the second process and
a distance between the plurality of markers determined based on the pre-designated positional relationship,
wherein
a plurality of columnar marker poles are vertically extended from a road surface, and
markers are positioned on the columnar marker poles so as to face in directions toward the vehicle, each marker at a pre-designated height from the road surface.

5. The calibration method according to claim 4, wherein the parameter calculated in the third process includes at least one of a vertical component of a position of the camera, a pitch angle of the camera, and a roll angle of the camera.

6. The calibration method according to claim 5, wherein in the third process, at least either a yaw angle of the camera or a horizontal component of the position of the camera is further calculated as the parameter of the camera based on a position difference between a line segment connecting the plurality of markers represented in the specific plane and a line segment connecting the plurality of markers determined based on the pre-designated positional relationship.

7. The calibration method according to claim 4, wherein:
the vehicle is mounted with a plurality of the cameras; and
the first process to the third process are performed for each camera.

8. A calibration device for calibrating an attitude of a camera mounted on a vehicle using a plurality of markers each arranged vertically and each positioned at a pre-designated height from a road surface, the calibration device comprising:
an image acquirer that acquires a two-dimensional image representing the plurality of markers shot by the camera;
a converter that converts the two-dimensional image acquired by the image acquisition unit and representing the plurality of markers into a bird's eye view image on a specific plane, the bird's eye view image reflecting the height of each of the plurality of markers, wherein the specific plane is the road surface or on a plane parallel to the road surface;
a calculator that calculates a parameter of the camera based on a position difference between the plurality of markers represented in the specific plane acquired by the converter; and
a plurality of columnar marker poles that are vertically extended from a road surface,
wherein
markers are positioned on the columnar marker poles so as to face in directions toward the vehicle, each marker at a pre-designated height from the road surface.

9. The calibration device according to claim 8, wherein the parameter calculated by the calculator includes at least one of a vertical component of a position of the camera, a pitch angle of the camera, and a roll angle of the camera.

10. The calibration device according to claim 9, wherein:
the vehicle is mounted with a plurality of the cameras;
the image acquirer acquires a plurality of two-dimensional images shot by each of the plurality of cameras, each two-dimensional image representing the plurality of markers;
the converter converts each of the two-dimensional images acquired by the image acquisition unit into a bird's eye view image; and
the calculator calculates a parameter of each of the plurality of camera, a particular marker shot by one camera having the same position in the converted bird's eye view image as that shot by another camera, wherein the parameter of each camera includes at least either a yaw angle of the camera or a horizontal component of the position of the camera.

11. A calibration device for calibrating an attitude of a camera mounted on a vehicle using a plurality of markers horizontally spaced apart in a pre-designated positional relationship, each marker having a pre-designated distance from a road surface, the calibration device comprising:
an image acquirer that acquires a two-dimensional image representing the plurality of markers shot by the camera;
a converter that converts the two-dimensional image acquired by the image acquirer and representing the plurality of markers into a bird's eye view image on a specific plane, the bird's eye view image reflecting the height of each of the plurality of markers, wherein the specific plane is a road surface or on a plane parallel to the road surface;
a calculator that calculates a parameter of the camera based on
a difference between a distance between the plurality of markers represented in the bird's eye view image on the specific plane acquired by the converter and
a distance between the plurality of markers determined based on the pre-designated positional relationship; and
a plurality of columnar marker poles that are vertically extended from a road surface,
wherein
markers are positioned on the columnar marker poles so as to face in directions toward the vehicle, each marker at a pre-designated height from the road surface.

12. The calibration device according to claim 11, wherein the parameter calculated by the calculator includes at least one of a vertical component of a position of the camera, a pitch angle of the camera, and a roll angle of the camera.

13. The calibration device according to claim 12, wherein the calculator further calculates at least either a yaw angle of the camera or a horizontal component of the position of the camera as the parameter of the camera based on
a position difference between a line segment connecting the plurality of markers represented in the specific plan and
a line segment connecting the plurality of markers determined based on the pre-designated positional relationship.

14. The calibration device according to claim 11, wherein the vehicle is mounted with a plurality of the cameras, and said each unit performs processing for each camera.

15. The calibration method according to claim 1, wherein four marker poles surround the area in which the vehicle is placed;
the four maker poles each include markers, at a same height from the road surface, that respectively face in a directions toward the vehicle;
the markers are positioned in a plane parallel to the road surface; and
the positions in the plane of the markers are pre-designated.

16. The calibration method according to claim 4, wherein four marker poles surround the area in which the vehicle is placed;
the four marker poles each include markers, at a same height from the road surface, that respectively face in a directions toward the vehicle;
the markers are positioned in a plane parallel to the road surface; and
the positions in the plane of the markers are pre-designated.

17. The calibration device according to claim 8, further comprising:
four marker poles surrounding the area in which the vehicle is placed,
wherein
the four maker poles each include markers, at a same height from the road surface, that respectively face in a directions toward the vehicle;
the markers are positioned in a plane parallel to the road surface; and
the positions in the plane of the markers are pre-designated.

18. The calibration device according to claim 11, further comprising:

four marker poles surround the area in which the vehicle is placed, wherein the four marker poles each include markers, at a same height from the road surface, that respectively face in a directions toward the vehicle;

the markers are positioned in a plane parallel to the road surface; and the positions in the plane of the markers are pre-designated.

19. The calibration method according to claim 1, wherein the pre-designated height is the same height from the road surface so that the markers are all positioned in a plane parallel to the road surface.

20. The calibration method according to claim 1, wherein at least two of the markers are positioned on one of the plurality of columnar marker poles, an upper marker is positioned in a side of an upper end of the one of the columnar marker poles, a lower marker is positioned on a lower side on the one of the columnar marker poles with respect to the upper marker, and the upper marker and the lower marker are vertically aligned on the one of the columnar marker poles.

* * * * *